(12) United States Patent
Horii et al.

(10) Patent No.: US 6,526,620 B2
(45) Date of Patent: Mar. 4, 2003

(54) WIPER APPARATUS WITH TWISTING

(75) Inventors: Takayoshi Horii, Wako (JP); Masaaki Terawaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/993,460

(22) Filed: Nov. 14, 2001

(65) Prior Publication Data
US 2002/0056168 A1 May 16, 2002

(30) Foreign Application Priority Data
Nov. 16, 2000 (JP) ........................... 2000-350156

(51) Int. Cl.$^7$ ............... B60S 1/32; B60S 1/38; B60S 1/06
(52) U.S. Cl. .................. 15/250.23; 15/250.33
(58) Field of Search .............. 15/250.33, 250.23, 15/250.21, 250.44, 250.46

(56) References Cited

U.S. PATENT DOCUMENTS

| 3,014,232 A | * | 12/1961 | Krohm | 15/250.23 |
| 3,035,296 A | * | 5/1962 | Deibel | 15/250.23 |
| 4,958,405 A | * | 9/1990 | Kuhbauch | 15/250.21 |
| 5,325,563 A | * | 7/1994 | Cayan | 15/250.31 |
| 5,384,932 A | * | 1/1995 | Battlogg | 15/250.23 |
| 5,502,866 A | * | 4/1996 | Battlogg | 15/250.21 |

FOREIGN PATENT DOCUMENTS

JP          2707817          4/1992

* cited by examiner

Primary Examiner—Gary K. Graham
(74) Attorney, Agent, or Firm—Merchant & Gould, P.C.

(57) ABSTRACT

A wiper apparatus includes a wiper blade pivotable between a waiting position and an upwardly turning position. The wiper blade has first and second blade holding members disposed in alignment. Mounted to the first and second blade holding members is a blade rubber for wiping a curved windshield. Each blade holding member has a non-pivotal member and a pivotal member which are disposed in alignment. The pivotal member is pivotally connected via a pin to the non-pivotal member. The blade holding member further includes a twisting member. The twisting member has a sub-arm and a cam connected to the sub-arm. The sub-arm is designed to cause the cam to pivot in such a manner that the pivotal member pivots in a lateral direction of the wiper blade in response to the pivotal movement of the wiper blade. The pivotal movement of the pivotal member twists the blade rubber. The thus twisted blade rubber has its opposite ends disposed on the windshield at right angles thereto. As the wiper blade pivots between the waiting position and the turning position, the opposite ends of the blade rubber maintains a perpendicular relation to the windshield.

2 Claims, 13 Drawing Sheets

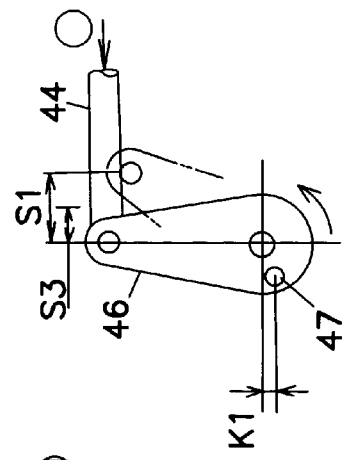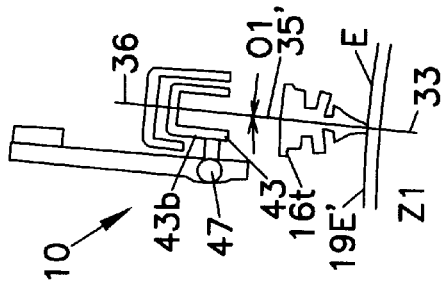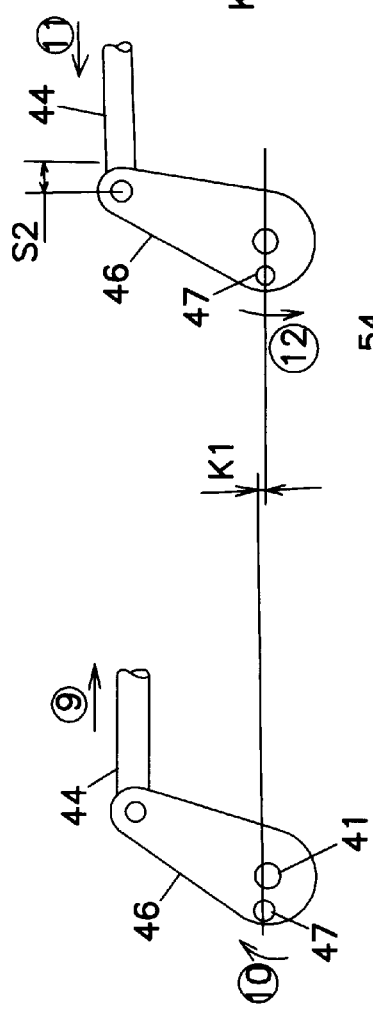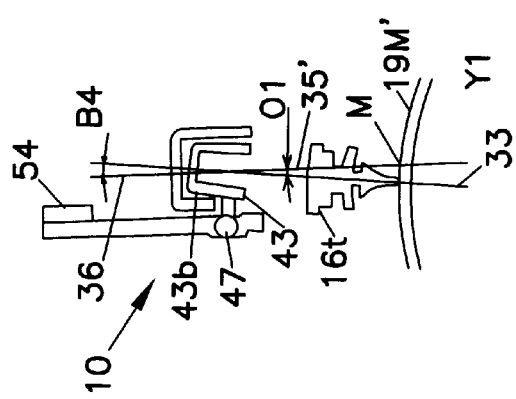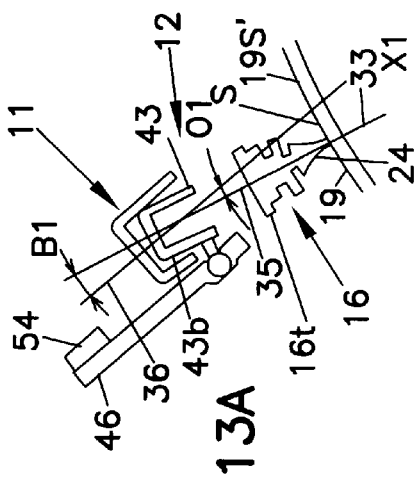

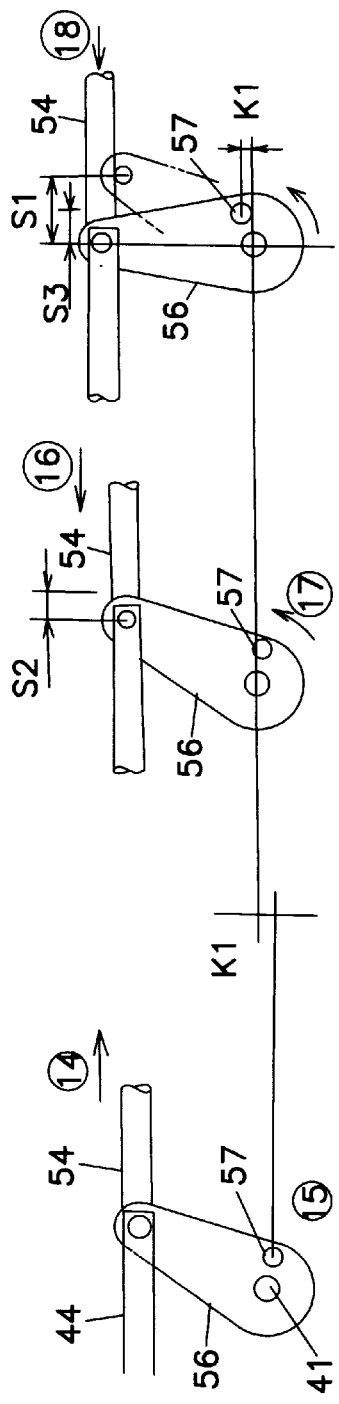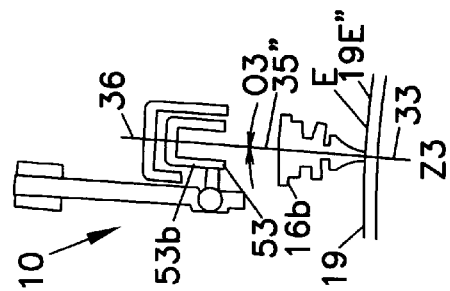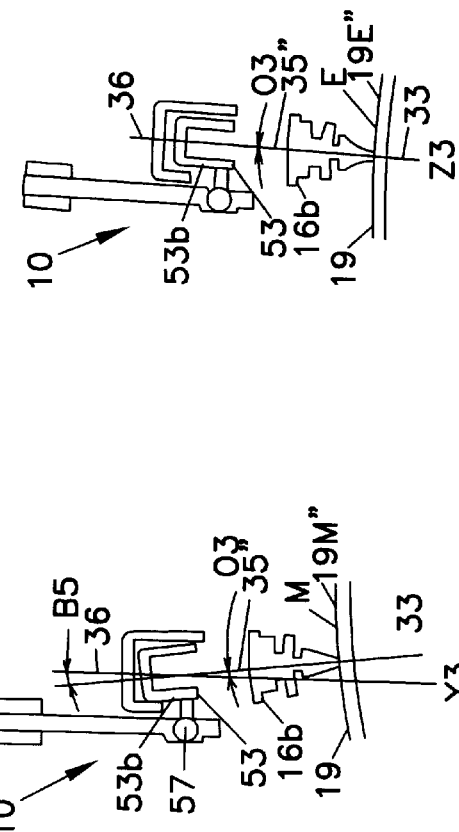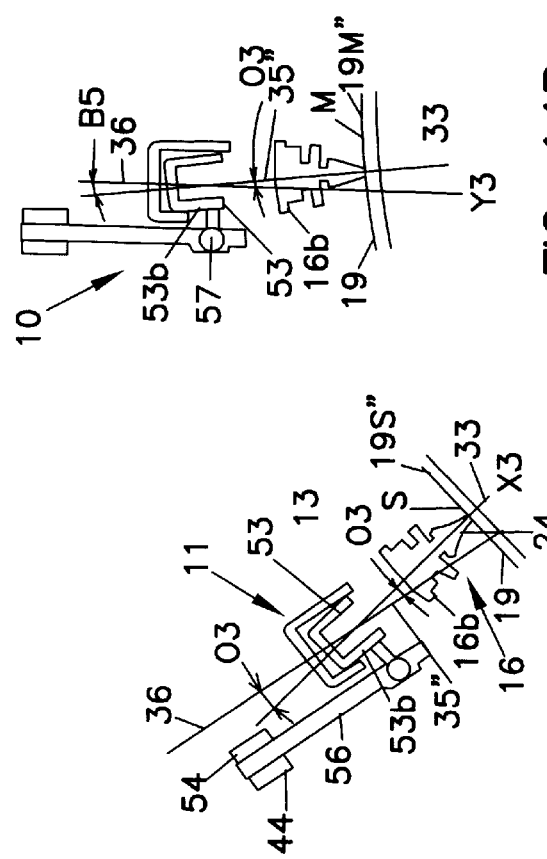
FIG. 14D
FIG. 14C
FIG. 14B
FIG. 14A

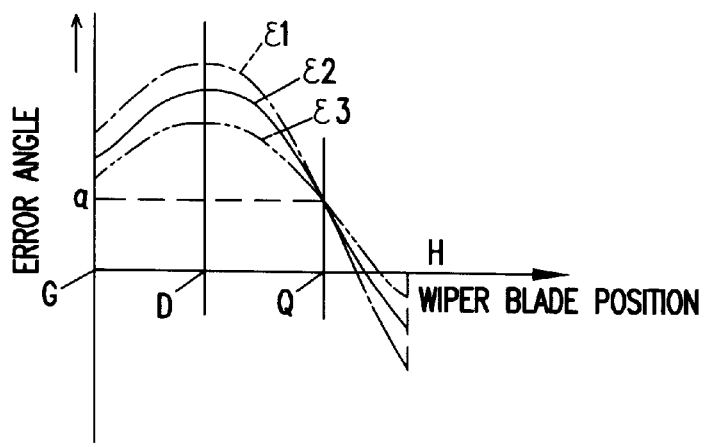
FIG. 15A
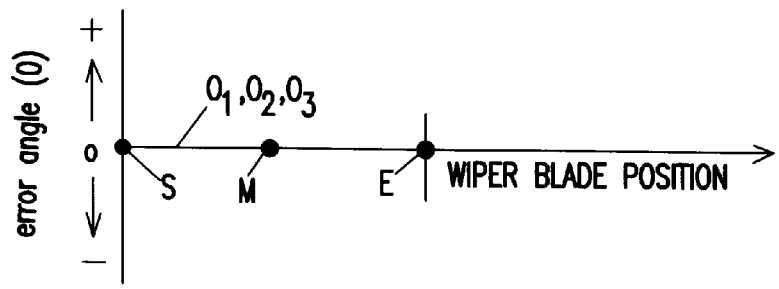
FIG. 15B
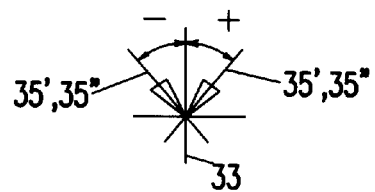

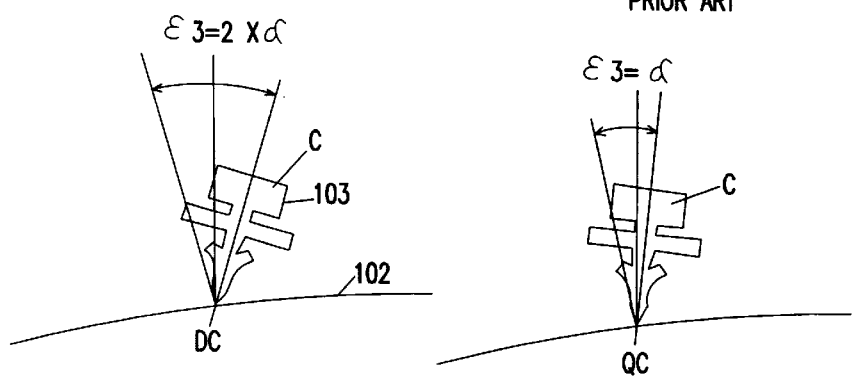
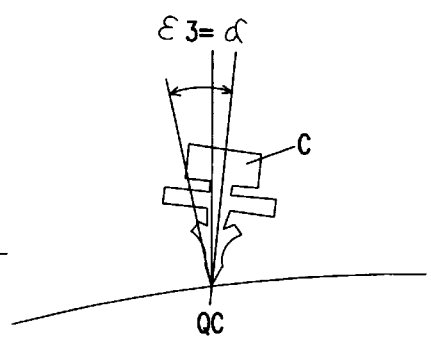
FIG. 18C PRIOR ART
FIG. 17C PRIOR ART
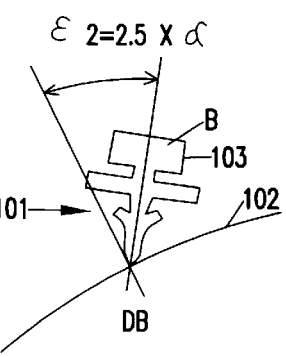
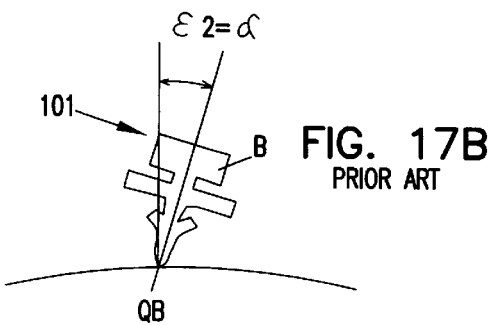
FIG. 18B PRIOR ART
FIG. 17B PRIOR ART
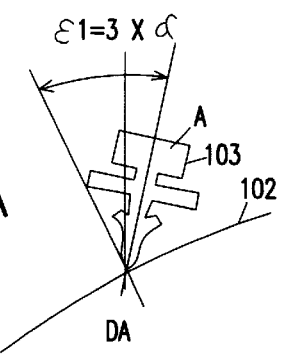
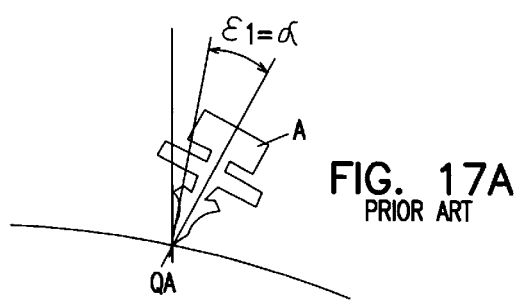
FIG. 18A PRIOR ART
FIG. 17A PRIOR ART

WIPER APPARATUS WITH TWISTING

FIELD OF THE INVENTION

The present invention relates to a wiper apparatus for wiping a curved vehicular window.

BACKGROUND OF THE INVENTION

There have been developed wiper apparatuses including wiper blades suitable for wiping curved surfaces of glass windows. These wiper blades are preferably disposed on the curved surfaces at desired angles. One example of such wiper apparatuses is disclosed in Japanese Patent No. 2707817. The disclosed wiper apparatus has a wiper blade including a rubber housing member. The rubber holding member has a twisted blade rubber mounted thereto. The twisted blade rubber has one end inclined a given angle away from a vertical line. Another end of the blade rubber is inclined another given angle away from the vertical line. FIG. 16 hereof shows the wiper apparatus disclosed in the aforementioned Japanese Patent. In wiping a curved windshield surface 102 at a particular position Q, the blade rubber of the wiper blade designated 101 has a center part B inclined an angle $\epsilon 2$ (=$\alpha$) away from a line (hereinafter referred to as "normal") extending perpendicularly to the windshield. Proximal and distal ends A, C of the blade rubber of the wiper blade 101 at the position Q are inclined angles $\epsilon 1$, $\epsilon 3$ (=$\alpha$) away from the normal. For ease of explanation, an angle the wiper blade 101 or the blade rubber is inclined away from the normal is hereinafter referred to as "error angle".

As discussed above, when positioned at the position Q, the blade rubber of the wiper blade 101 provides a constant error angle (=$\alpha$) along the entire length thereof. With the error angles $\epsilon 1$, $\epsilon 2$, $\epsilon 3$ close to each other, the wiper blade wipes the surface 102 efficiently.

As shown in FIG. 16, the wiper blade 101 pivots an angle U or moves back and forth between a stop position G and a turning position H to wipe the surface 102. An intermediate position D is located midway between the stop position G and the turning position H.

With respect to FIG. 17A through FIG. 17C hereof, the center part B and the proximal and distal ends A, C of the blade rubber designated 103 are shown as being disposed as the position Q. Likewise, in FIG. 18A through FIG. 18C hereof, the center part B and the proximal and distal ends A, C are shown as being disposed at the intermediate position D.

Referring to FIG. 17B, the wiper blade 101 has the error angle $\epsilon 2$ (=$\alpha$) at the center part B. At the proximal and distal ends A, C, as shown in FIG. 17A and FIG. 17C, there are provided the error angles $\epsilon 1$, $\epsilon 3$ equal to the error angle $\epsilon 2$. This arrangement enables the wiper blade 101 to wipe the position Q and its surroundings with increased efficiency.

When disposed at positions other than the position Q, however, the blade rubber provides different error angles along the entire length thereof. The error angle of the blade rubber 103, disposed especially at the turning position H, significantly varies along its length.

Reference is made to FIG. 18B. The center part B has the error angle $\epsilon 2$ which is 2.5 times the angle $\alpha$. The error angle $\epsilon 1$ of the proximal end A is 3 times the angle $\alpha$, as shown in FIG. 18A. The distal end C provides the error angle $\epsilon 3$ which is twice the angle $\alpha$, as shown in FIG. 18C. As can be seen from these figures, there is a significant difference in error angle between the proximal end A, the center part B and the distal end C of the blade rubber 103 located at the position D. Accordingly, some materials to be wiped off would be unfortunately left on the curved surface 102 of the windshield.

SUMMARY OF THE INVENTION

An object of the present invention is to provide a wiper apparatus including a blade rubber which, when moving over a curved surface of a glass window, is directed perpendicularly thereto, such that the curved surface is evenly wiped throughout.

According to an aspect of the present invention, there is provided a wiper apparatus comprising: (A) a drive shaft; (B) an arm head connected to the drive shaft; (C) an arm extending from the arm head, the arm being pivotable about the drive shaft; and (D) a wiper blade mounted to the arm and extending in substantially parallel to the arm; the wiper blade including: (a) a primary lever; (b) plural blade holding members mounted to the primary lever, the blade holding members being disposed in alignment; (c) a blade rubber mounted to the blade holding members; the blade holding members each including: (i) a pivotal member; (ii) a twisting member fixed to the pivotal member; (iii) a non-pivotal member connected to the pivotal member in such a manner that the twisting member causes the pivotal member to pivot in a lateral direction of the primary lever in response to pivotal movement of the arm.

The pivotal member is pivotally connected to the non-pivotal member. The pivotal member and the non-pivotal member are provided in alignment. The twisting member is arranged to cause the pivotal member to point in the lateral direction of the primary lever in response to the pivotal movement of the arm. The pivotal movement of the pivotal member twists the blade rubber. The thus twisted blade rubber has its opposite ends disposed on a curved windshield at right angles thereto. During the pivotal movement of the arm, the opposite ends of the blade rubber maintain a substantially perpendicular relation to the windshield. The wiper apparatus thus arranged provides an improved ability to wipe the windshield. In other words, there can be achieved an improved performance of the wiper apparatus for wiping the windshield.

In a preferred form of the present invention, the twisting member comprises a sub-arm pivotable on a support shaft spaced from the drive shaft by a given distance, and a cam connected to the sub-arm, the sub-arm causing the cam to pivot in such a manner that the pivotal member pivots in the lateral direction of the primary level.

The twisting member is formed by the small number of parts, i.e., the sub-arm and the cam. Providing such a twisting member helps manufacture the wiper apparatus at a low cost.

BRIEF DESCRIPTION OF THE DRAWINGS

A certain preferred embodiment of the present invention will hereinafter be described in detail, by way of example only, with reference to the accompanying drawings, in which:

FIG. 13A through FIG. 13C are cross-sectional views taken along lines X1, Y1, Z1 of FIG. 11, respectively, and along with FIGS. 13D and 13E show how a blade rubber of the wiper blade is twisted in response to movement of a link and a first sub-arm of the wiper blade;

FIG. 14A through FIG. 14C are cross-sectional views taken along line X3, Y3, Z3 of FIG. 11, respectively, and along with FIG. 14D show how the blade rubber of the wiper blade is twisted in response to movement of another link and a second sub-arm of the wiper blade;

FIG. 15A graphically shows how respective error angles of a proximal end, a center part and a distal end of a conventional wiper blade vary in correspondence to positions of the wiper blade while FIG. 15B graphically shows a relation between a position of the wiper blade of the present invention and respective error angles of a central portion, a leading end and a trailing end of the wiper blade;

FIG. 17A through FIG. 17C are cross-sectional views taken along lines QA, QB, QC of FIG. 16, respectively; and FIG. 18A through FIG. 18C are cross-sectional views taken along lines DA, DB, DC of FIG. 16, respectively;

DETAILED DESCRIPTION OF THE PREFERRED EMBODIMENTS

Figure 1A:
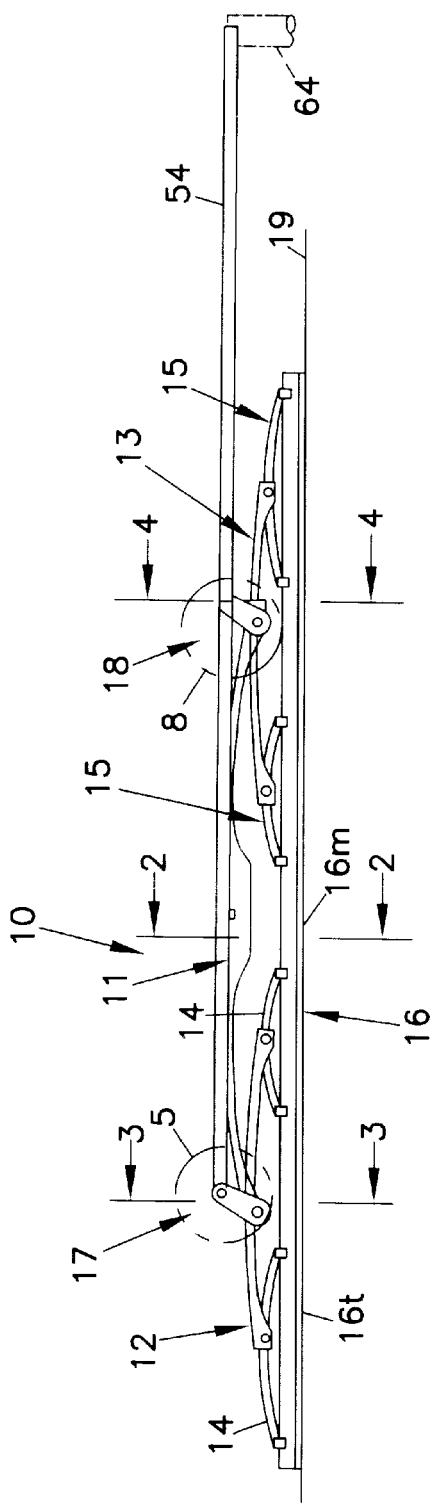
FIG. 1A is a front elevation view of a wiper blade of a wiper apparatus of the present invention and FIG. 1B is a plan view of the wiper blade.

Referring to FIG. 1A, a wiper blade 10 of a wiper apparatus 60 (see FIG. 10) is shown including a primary lever 11, a first blade holding member 12 mounted to one end of the primary lever 11, and a second blade holding member 13 mounted to another end of the primary lever 11. The first and second blade holding members 12, 13 are disposed in alignment. The first blade holding member 12 has two yokes 14, 14 attached thereto while the second blade holding member 13 has two yokes 15, 15 attached thereto. These yokes 14, 14, 15, 15 have a blade rubber 16 mounted thereto. The first blade holding member 12 includes a first twisting member 17 provided centrally thereof. Likewise, the second blade holding member 13 includes a second twisting member 18 provided centrally thereof. The blade rubber 16 is provided for wiping a curved windshield 19.

Figure 1B:
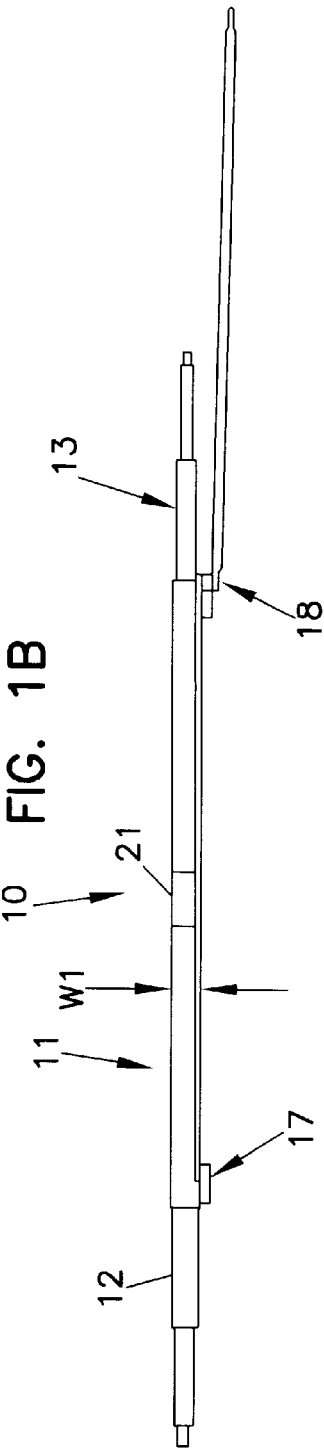

As shown in FIG. 1B, the first and second blade holding members 12, 13 have the first and second twisting members 17, 18 provided at their respective sides.

The primary lever 11 has a width W1 and an inverted U-shaped cross-section. The lever 11 has an arm mounting portion 12 formed centrally thereof.

Figure 2:
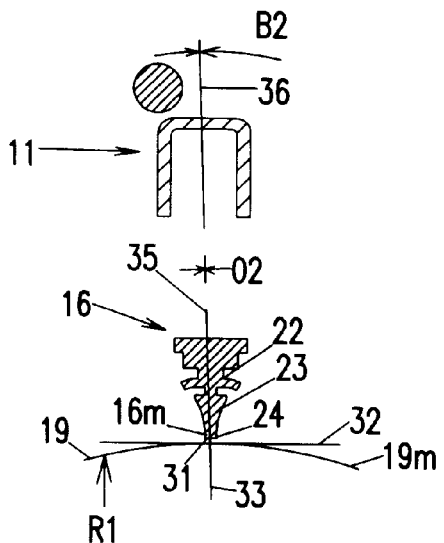
FIG. 2 is a cross-sectional view taken along line 2—2 of FIG. 1.

In relation to FIG. 2, the primary lever 11 and a rubber central portion 16m of the blade rubber 16 are shown in cross-section. The blade rubber 16 includes a neck portion 22, a lip portion 23, and an edge portion 24. The rubber central portion 16m is set on the windshield 19 perpendicularly thereto. The primary lever 11 is also set on the windshield 19 at right angles thereto.

A first surface 19m of the windshield 19 on which the rubber central portion 16m is disposed is curved to provide a radius R1 of curvature. A line 32 is tangent to the first surface 19m at a point 31. A line 33 is perpendicular to the line 32. A central axis 35 of the rubber central portion 16m extends perpendicularly to the line 32. A central axis 36 of the primary lever 11 is also perpendicular to the line 32. In other words, an angle θ2 the axis 35 of the rubber central portion 16m is inclined away from the line 33 is zero degree. This means that an error angle θ2 of the rubber central portion 16m is zero degree. The term "error angle" refers to an angle through which the central axes 35, 36 of the primary lever 11 and the blade rubber 16 is inclined away from the line 33, as previously discussed. An angle β2 provided between the axis 35 and the axis 36 is zero degree.

Figure 3:
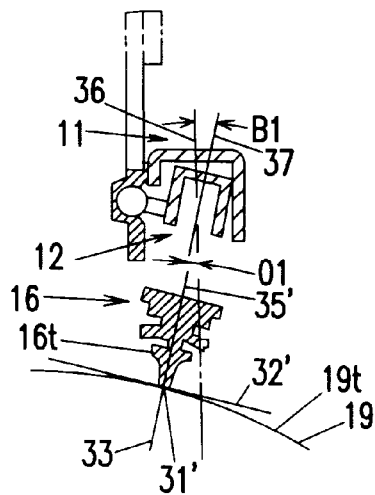
FIG. 3 is a cross-sectional view taken along line 3—3 of FIG. 1.

Reference is made to FIG. 3. The primary lever 11, the first blade holding member 12, and a rubber leading end 16t of the blade rubber 16 are shown in cross-section. The axis 36 is inclined an angle β1 away from a central axis 35' of the rubber leading end 16t. The first blade holding member 12 twists or turns the rubber leading end 16t the angle β1, whereby the leading end 16t is substantially perpendicularly positioned on a second surface 19t of the windshield 19 having a radius of curvature different from R1. In other words, the axis 35' is perpendicular to a line 32' tangent to the second surface 19t at a point 31'. An error angle θ1 of the rubber leading end 16t is thus zero degree.

A central axis 37 of the first blade holding member 12 extends perpendicularly to the line 32' to achieve the error angle θ1 of zero degree. Description will be hereinafter made as to construction of the first blade holding member 12.

Figure 4:
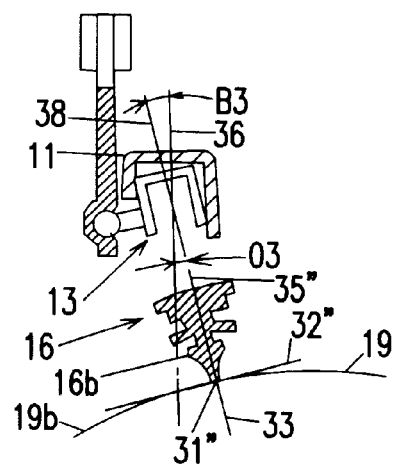
FIG. 4 is a cross-sectional view taken along line 4—4 of FIG. 1.

With reference to FIG. 4, the primary lever 11, the second blade holding member 13, and a rubber trailing end 16b of the blade rubber 16 are shown in cross-section. The axis 36 is inclined an angle β3 away from a central axis 35" of the rubber trailing end 16b. The second blade holding member 13 twists or turns the rubber trailing end 16b through the angle β3 such that the trailing end 16b is perpendicularly positioned on a third surface 19b of the windshield 19 having a radius of curvature different from those of the first and second surfaces 19m, 19t. Namely, the central axis 35" is perpendicular to a line 32" tangent to the third surface at a point 31". An error angle θ3 of the trailing end 16b is thus zero degree.

A central axis 38 of the second blade holding member 13 is orthogonal to the line 31" to achieve the error angle θ3 of zero degree. Discussion will be hereinafter made as to the construction of the second blade holding member 13.

Figure 5:
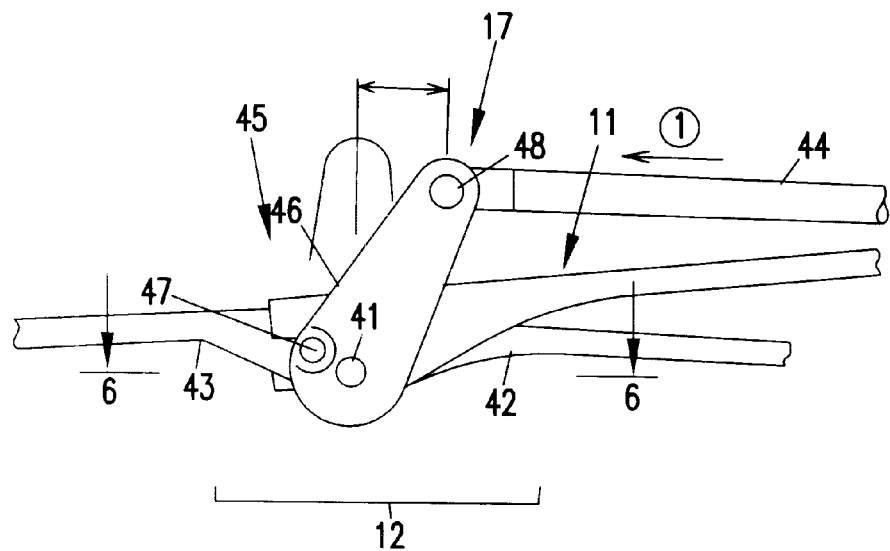
FIG. 5 is a view showing on an enlarged scale a part of the wiper blade as encircled by a circle 5 of FIG. 1.
Figure 6:
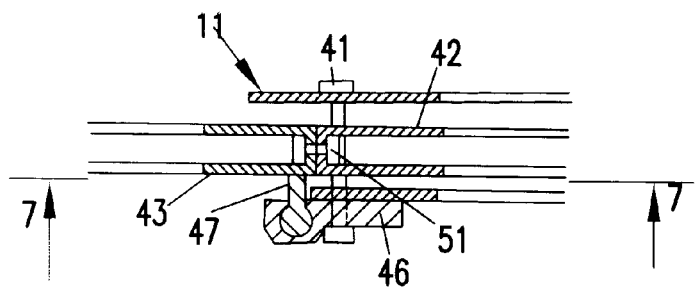
FIG. 6 is a cross-sectional view taken along 6—6 of FIG. 5.

Referring to FIG. 5 and FIG. 6, the first blade holding member 12 includes a first division holding member (a non-pivotal member) 42 positioned closely to a first sub-arm 44, and a second division holding member (a pivotal member) 43 pivotally connected to the division holding member 42. The division holding member 42 is attached via a pin 41 to the one end of the primary lever 11.

The first twisting member 17 includes the first sub-arm 44 and a first cam 45.

The first cam 45 includes a link 46 mounted via the pin 41 and the one end of the primary lever 11, and a drive pin 47 connected to a left side of the link 46. The link 46 is connected through a pin 48 to the first sub-arm 44. The drive pin 47 is fixed to a left side 43b (see FIG. 13A to FIG. 13C) of the division holding member 43.

Figure 11:
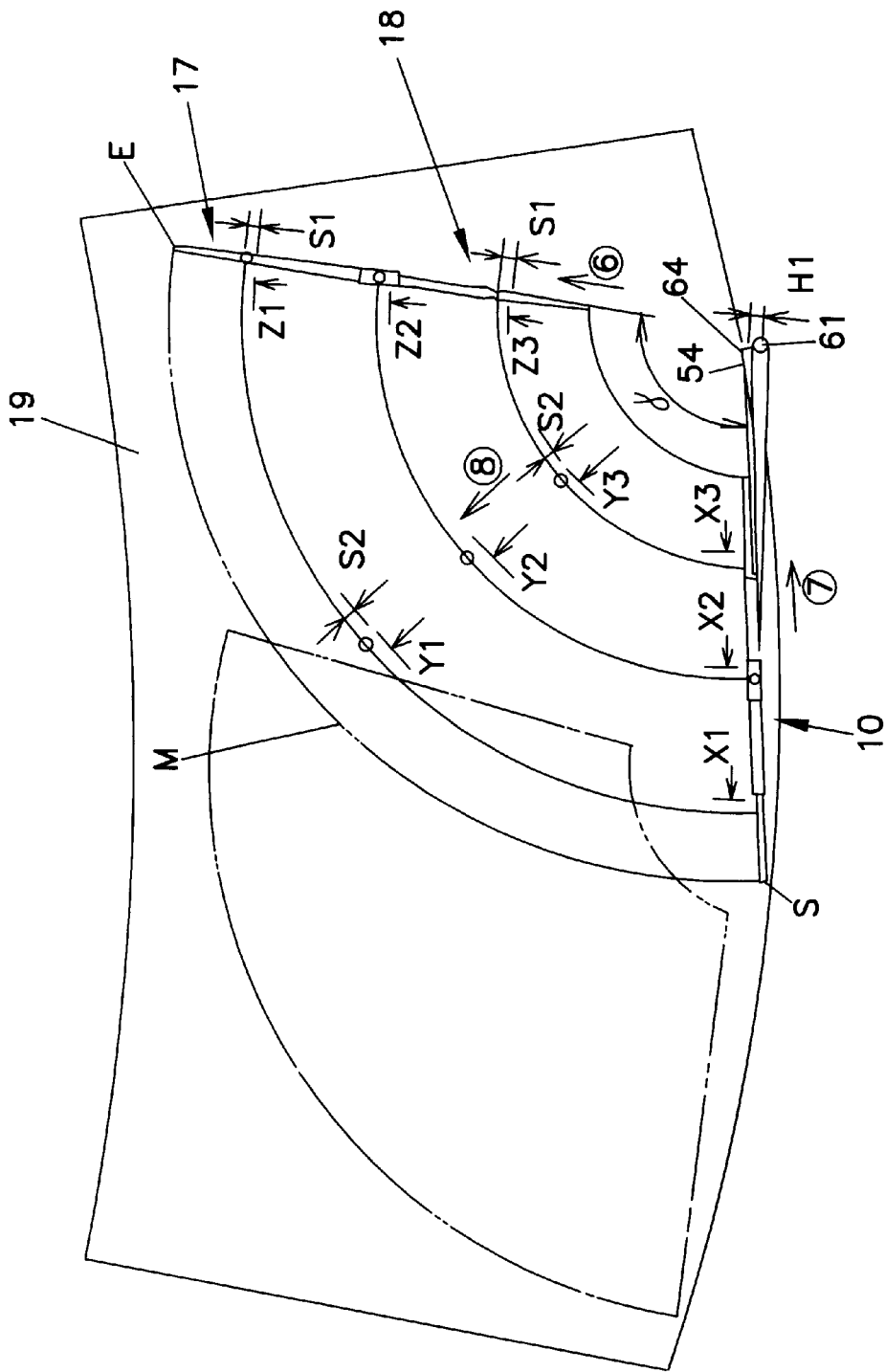
FIG. 11 is a view showing how the wiper blade wipes a windshield.

The first sub-arm 44 is caused to move in a direction as indicated by an arrow ① once the wiper blade 10 moves from a waiting position S (see FIG. 11). The first sub-arm 44 then moves a distance S1 to thereby cause the link 46 to pivot counterclockwise on the pin 41, as shown by an arrow.

The division holding members 42, 43 are connected together via a pin 51 in such a manner that the division holding member 43 pivots in a lateral or transverse direction of the primary lever 11.

Figure 7:
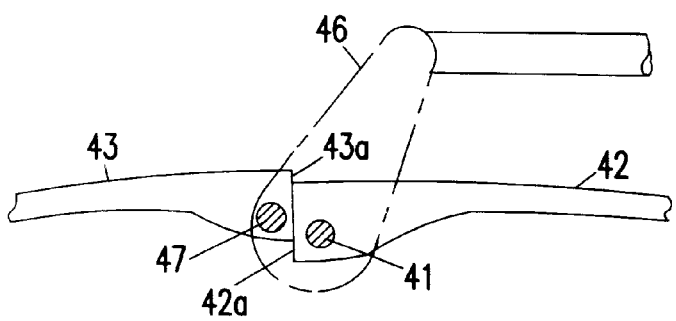
FIG. 7 is a cross-sectional view taken along line 7—7 of FIG. 6.

With an end surface 42a of the holding member 42 mated with an end surface 43a of the holding member 43, the holding members 42, 43 are disposed in alignment, as shown in FIG. 7.

Figure 8:
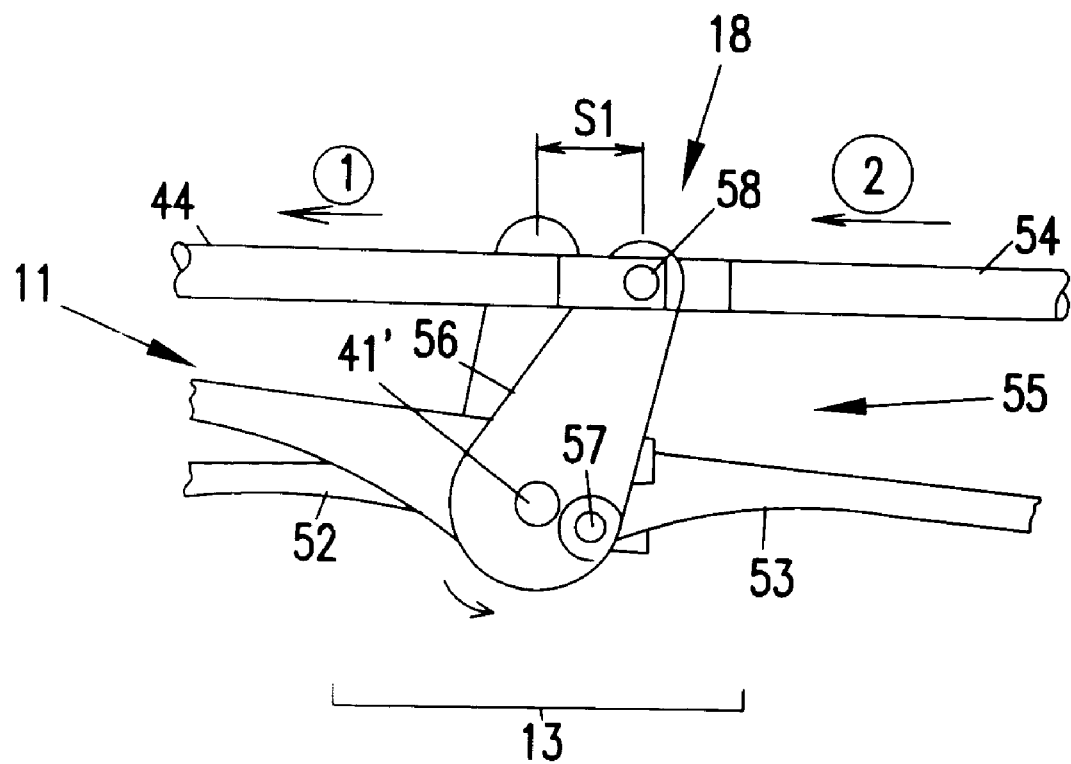
FIG. 8 is a view showing on an enlarged scale a part of the wiper blade as encircled by a circle 8 of FIG. 1.

With reference to FIG. 8, the second blade holding member 13 includes a first division holding member (a non-pivotal member) 52 positioned closer to the first sub-arm 44 than to a second sub-arm 54, and a second division holding member (a pivotal member) 53 pivotally connected to the holding member 52. The holding member 52 is mounted via a pin 41' to the another end of the primary lever 11.

The second twisting member 18 includes the second sub-arm 54 and a second cam 55.

The second cam 55 includes a link 56 connected to the another end of the primary lever 11 by means of the pin 41', and a drive pin 57 connected to a right side of the link 56. The link 56 is connected to the first and second sub-arms 44, 54 via a pin 58.

Once the wiper blade 10 moves from the waiting position S, the second sub-arm 54 is caused to move in a direction as shown by an arrow ②. The second sub-arm 54 then moves the distance S1 to thereby push the first sub-arm 44, as indicated by the arrow ①, as well as causing the link 56 to pivot counterclockwise on the pin 41', as shown by an arrow.

Since the drive pin 41 is positioned leftwardly of the pin 41 while the drive pin 57 is positioned rightwardly of the pin 41, the first blade holding member 12 and the second blade holding member 13 pivot in opposite directions as will be described in detail.

Figure 9:
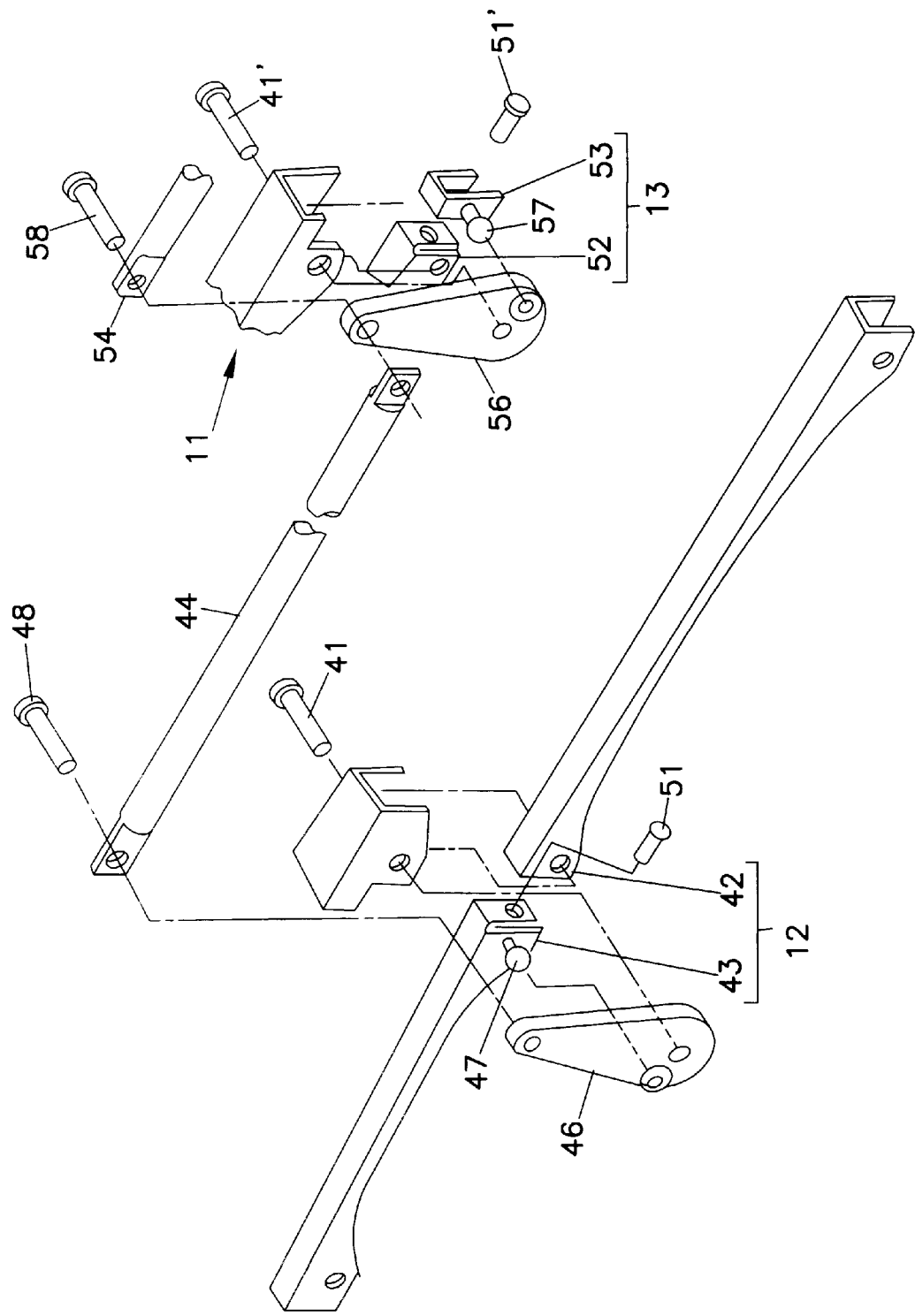
FIG. 9 is a view showing in perspective the wiper blade as exploded.

With respect to FIG. 9, the second division holding member 53 is connected via a pin 51' to the first division holding member 52 in such a manner as to pivot in the lateral or transverse direction of the primary lever 11. The second blade holding member 13 and the link 56 are mounted to the primary lever 11 by means of the pin 41'. The link 56 has the drive pin 57 connected thereto. The drive pin 57 is fixed to a left side 53b (see FIG. 14A through FIG. 14C) of the holding member 53, as is the drive pin 47.

The first division holding member 42 is connected through the pin 51 to the second division holding member 43, as are the division holding members 52, 53. The first blade holding member 12 and the link 46 are also attached to the primary lever 11 via the pin 41. The drive pin 47 is connected to the link 46.

Figure 10:
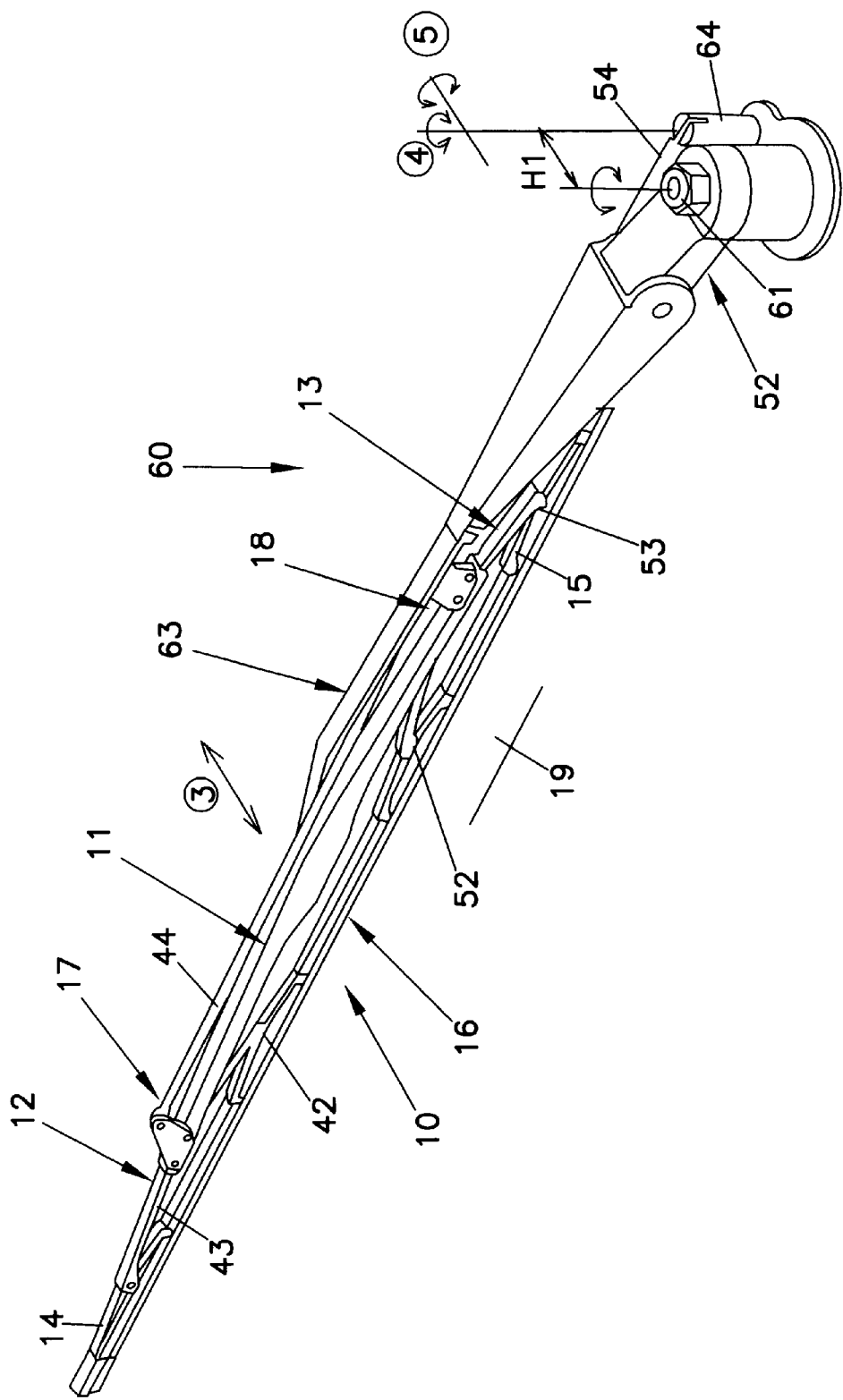
FIG. 10 is a perspective view of the wiper apparatus according to the present invention.

As shown in FIG. 10, the wiper apparatus 60 according to the present invention includes a drive shaft 61, an arm head 62 connected to the drive shaft 61, an arm 63 extending from the arm head 62, and the wiper blade 10 mounted to the arm 63. When operated, the drive shaft 61 causes the arm head 62 to pivot thereon, as shown by an arrow. The arm 63 is thus pivotable about the drive shaft 61, as indicated by an arrow ③. The wiper blade 10 extends in substantially parallel to the arm 63. A support shaft 64 is positioned adjacent the drive shaft 61.

The support shaft 64 is horizontally spaced from the drive shaft 61 by a given distance H1. The second sub-arm 54 has its proximal end supported on the shaft 64. The second sub-arm 54 is horizontally and vertically pivotable on the shaft 64, as shown by arrows ④, ⑤, respectively.

As illustrated in FIG. 11, the wiper apparatus 60 or the arm 64 moves back and forth or pivots between the waiting position S and an upwardly turning position E to thereby wipe the windshield 19. During the wiping operation, the second sub-arm 54 also is caused to pivot on the support shaft 64 between the waiting position S and the turning position E in synchronization with the pivotal movement of the arm 63. While pivoting between the waiting position S and the turning position E, the second sub-arm 54 longitudinally reciprocates or moves back and forth along the arm 64, as indicated by arrows ⑥, ⑦. By pivoting to the turning position E, the arm 63 comes into vertical alignment with the second sub-arm 54. It is to be understood that since the arm 63 pivots to the turning position E, the first and second sub-arms 44, 54 of the first and second twisting members 17, 18 are longitudinally shifted or moved the distance S1 in the manner as described with respect to FIG. 5 and FIG. 8. The distance H1 is equal to the distance S1.

It should be noted that, while pivoting from the waiting position S to an intermediate position M, the second sub-arm 54 is longitudinally shifted or moved a distance S2 as shown by an arrow ⑧. The arm 64 pivots through an angle γ on the drive shaft 61.

Figure 12C:
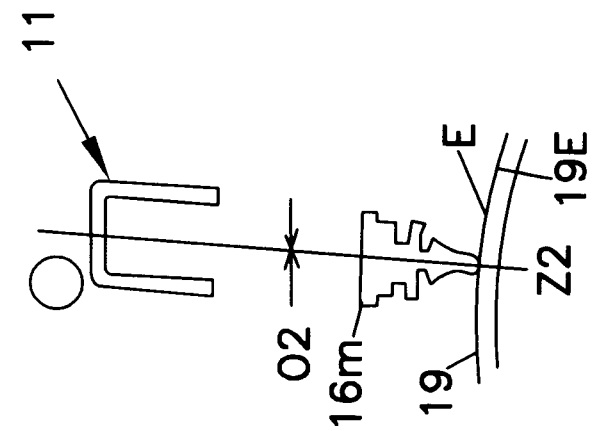
FIG. 12A through FIG. 12C are cross-sectional views taken along lines X2, Y2, Z2 of FIG. 11, respectively.
Figure 12B:
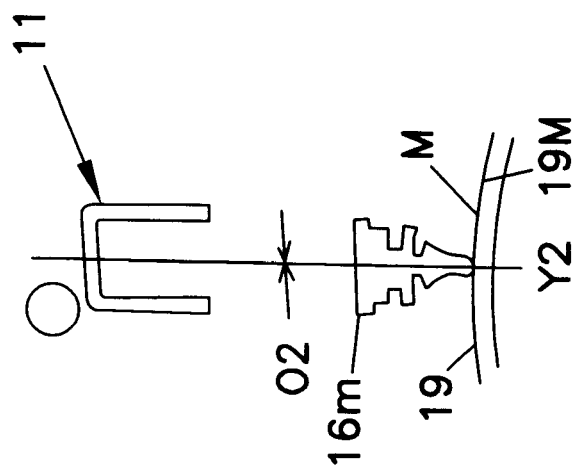
Figure 12A:
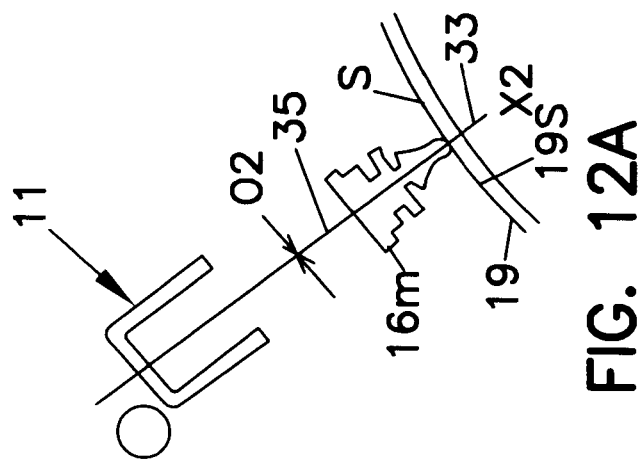
Figure 16:
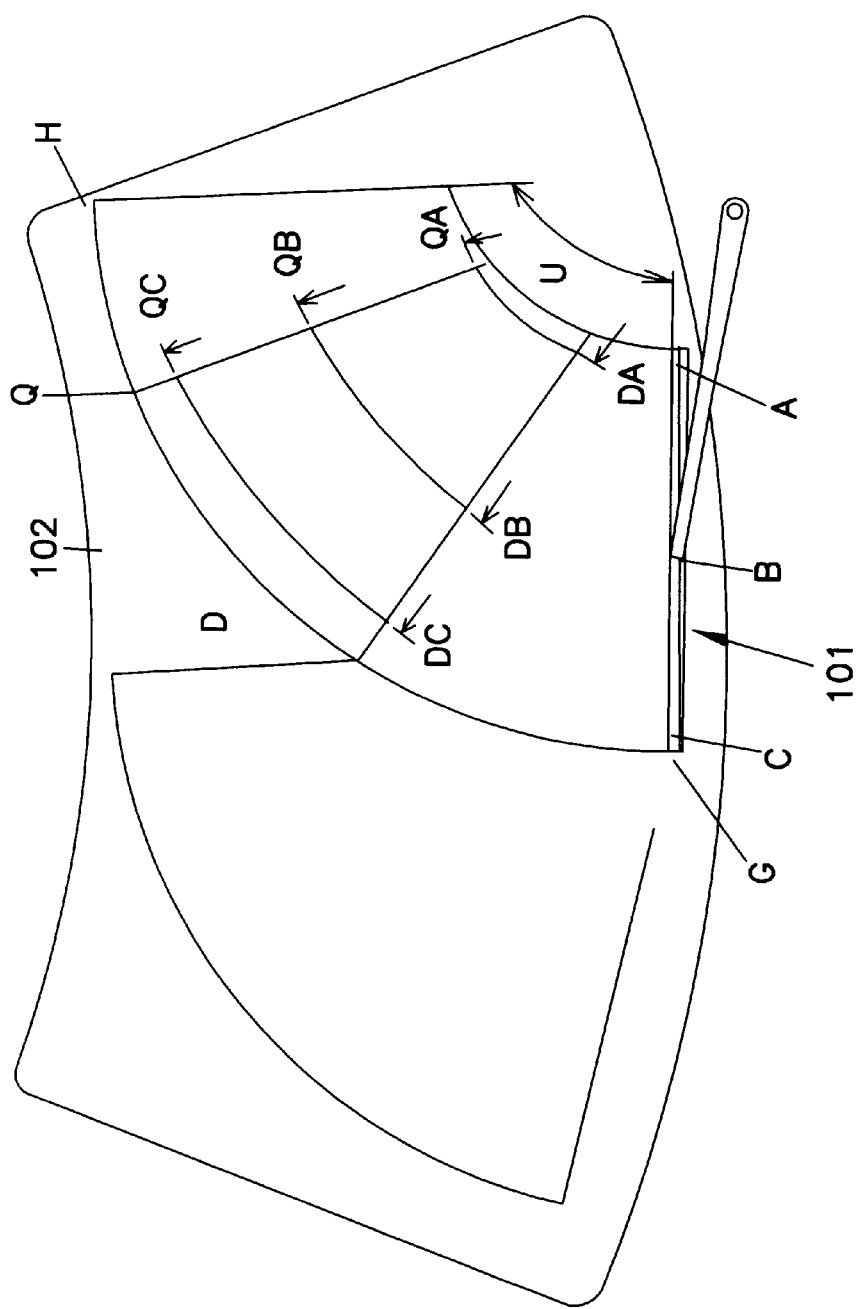
FIG. 16 is a view showing how the conventional wiper blade wipes a windshield.

Referring to FIG. 12A, the rubber central portion 16m is disposed at the waiting position S. More specifically, the central portion 16m is oriented perpendicularly to a surface 19S of the windshield 19. The axis 35 coincides with the line 33. In other words, the error angle θ2 of the central portion 16m is about zero degree.

In FIG. 12B, the rubber central portion 16m is shown as being positioned at the intermediate position M. As can be seen from this figure, the central portion 16m is disposed at right angles to a surface 19M of the windshield 19. The error angle θ2 of the central portion 16m is about zero degree.

As shown in FIG. 12C, the rubber central portion 16m is disposed at the turning position E. The central portion 16m is positioned perpendicularly to a surface 19E of the windshield 19. The error angle θ2 is about zero degree.

The primary lever 11 is oriented perpendicularly to the surfaces 19S, 19M, 19E to thereby provide the error angle of about zero degree. Therefore, the rubber central portion 16m mounted to the primary lever 11 maintains a substantially perpendicular relation to these surfaces of the windshield 19.

FIG. 13A shows the rubber leading end 16t positioned at the waiting position S. A curved surface 19S' of the windshield 19 on which the rubber leading end 16t is disposed differs from the surfaces 19S, 19M, 19E in radius of curvature. The primary lever 11 is not oriented at right angles to the surface 19S'. Unlike the primary lever 11, however, the rubber leading end 16t is disposed perpendicularly to the surface 19S'. If the axis 35' coincided with the axis 36 of the primary lever 11 as is the axis 35 of the rubber central portion 16m, the error angle θ1 of the rubber leading end 16t would be very large (β1 degrees). In other words, the error angle θ1 would be negative or the axis 35' would be inclined leftward (towards a negative region) away from the line 33 (see FIG. 15B). The expression "towards the negative region" as used herein refers to "towards the waiting position S". If so, the rubber leading end 16*t* would provide poor ability to wipe the surface 19S'.

Indeed, the first sub-arm 44 (see FIG. 13D), when set at the waiting position S, is pulled or caused to move in a direction as indicated by an arrow ⑨ to cause the link 46 to pivot as shown by an arrow ⑩, whereby the drive pin 47 turns clockwise to thereby cause the left side 43*b* or the second division holding member 43 to pivot clockwise through β1 degrees. This enables the rubber leading end 16*t* to pivot clockwise through β1 degrees, too. With this arrangement, the rubber leading end 16*t* is oriented at right angles to the surface 19S' to thereby provide the error angle θ1 of about zero degrees. Thus, the leading end 16*t* maintains a substantially perpendicular relation to the windshield 19 as the wiper blade 10 is set at the waiting position S. It is to be understood that the thus arranged rubber leading end 16*t* evenly wipes the surface 19S' and its surroundings.

Reference is made to FIG. 13B showing the rubber leading end 16*t* at the intermediate position M. If the axis 35' coincided with the axis 36, the error angle θ1 of the rubber leading end 16*t* would be not zero but β4 degrees. Indeed, when the wiper blade 10 pivots from the waiting position to the intermediate position M, the first sub-arm 44 is caused to move the distance S2, as shown by an arrow ⑪ of FIG. 13B, the link 46 pivots counterclockwise as shown by an arrow ⑫ (see FIG. 13D), to thereby lower the drive pin 47 by a distance K. This means that the drive pin 47 is caused to turn counterclockwise. The left side 43*b* or the second division holding member 43 thus pivots counterclockwise, too. Consequently, the rubber leading end 16*t* is oriented substantially perpendicularly to a windshield surface 19M' of radius of curvature different from that of the surface 19S'. The error angle θ1 of the rubber leading end 16*t* is thus about zero degree. The leading end 16*t* is maintained in substantially perpendicular relation to the windshield 19 as the wiper blade 10 pivots from the waiting position S to the intermediate position M. It will be appreciated that the rubber leading end 16*t* evenly wipes the surface 19M' and its surroundings.

With reference to FIG. 13C, when the wiper blade 10 pivots from the intermediate position M to the turning position E, the first sub-arm 44 is caused to move a distance S3 (S3=S1–S2), as indicated by an arrow ⑬ (see FIG. 13E), the link 46 pivots counterclockwise (as shown by an arrow) to thereby further lower the drive pin 47 by the distance K1. In other words, the drive pin 47 is caused to turn further counterclockwise, such that the left side 43*b* or the second division holding member 43 also pivots further counterclockwise. The rubber leading end 16*t* is therefore oriented substantially perpendicularly to a windshield surface 19E' of radius of curvature different from those of the surfaces 19S', 19M'. Accordingly, the leading end 16*t* provides the error angle θ1 of about zero degree. The leading end 16*t* is held in substantially perpendicular relation to the windshield 19 as the wiper blade 10 pivots from the intermediate position M to the turning position E. It becomes possible for the rubber leading end 16*t* to evenly wipe the surface 19E' and its surroundings.

With respect to FIG. 14A, a surface 19S" of the windshield 19 is curved to provide a radius of curvature different from that of the surface 19S. The primary lever 11 is not oriented at right angles to the surface 19S". Unlike the primary lever 11, however, the rubber trailing end 16*b* is positioned perpendicularly to the surface 19S". If the central axis 35" coincided with the axis 36 as is the axis 35 of the rubber central portion 16*m*, the error angle θ3 of the rubber trailing portion 16*b* would be vary large (β3 degrees). In other words, the error angle θ3 would be positive or the axis 35" would be inclined rightward (towards a positive region) away from the line 33 (FIG. 15B). The expression as used herein "towards the positive region" refer to "towards the turning position E". If so, the rubber trailing end 16*b* has poor ability to wipe the surface 19S".

Indeed, the second sub-arm 54, when set at the waiting position S, is pulled or cause to move as shown by an arrow ⑭ (see FIG. 14D). This movement of the second sub-arm 54 causes the link 56 to pivot as indicated by an arrow ⑮. The drive pin 57 is caused to turn counterclockwise, whereby the left side 53*b* or the second division holding member 53 pivots counterclockwise through β3 degrees. This cause the rubber trailing end 16*b* to pivot counterclockwise through β3 degrees. The rubber trailing end 16*b* thus comes into a perpendicular relation to the surface 19S" to thereby the error angle θ3 of about zero degree. The trailing end 16*b* maintains a substantially perpendicular relation to the windshield 19 as the wiper blade 10 is set at the waiting position S. The thus arranged rubber trailing end 16*b* evenly wipes the surface 19S" and its surroundings.

Reference is made to FIG. 14B showing the rubber trailing end 16*b* at the intermediate position M. If the axis 35" coincided with the axis 36, the error angle θ3 would be not zero but β5 degrees. Indeed, when the wiper blade 10 pivots from the waiting position S to the intermediate position M, the second sub-arm 54 is caused to move the distance S2 as shown by an arrow ⑯ (see FIG. 14D). Thereafter, the link 56 pivots, a shown by an arrow ⑰, to thereby raise the drive pin 57 by the distance K1. This means that the drive pin 57 is caused to turn clockwise. The left side 53*b* or the second division holding member 53 also pivots clockwise. The rubber trailing end 16*b* is thus brought into perpendicular relation to a windshield surface 19M" having a radius of curvature different from that of the surface 19S". As a result, the error angle θ3 of the trailing end 16*b* is about zero degree. The trailing end 16*b* is maintained in substantially perpendicular relation to the windshield 19 as the wiper blade 10 pivots from the waiting position S to the intermediate position M. The rubber trailing end 16*t* can evenly wipe the surface 19M" and the surroundings.

Turning to FIG. 14C, when the wiper blade 10 pivots from the intermediate position M to the turning position E, the second sub-arm 54 is caused to move the distance S3, as indicated by an arrow ⑱ (see FIG. 14D). The link 56 thus pivots counterclockwise (as shown by an arrow) to thereby raise the drive pin 57 by the distance K1. Namely, the drive pin 57 is caused to turn clockwise. Accordingly, the left side 53*b* or the second division holding member 53 pivots clockwise, too. The rubber trailing end 16*b* is thus oriented substantially perpendicularly to a windshield surface 19E" having a radius of curvature different from those of the surfaces 19S", 19M". The error angle θ3 of the trailing end 16*b* is therefore about zero degree. The trailing end 16*b* remains oriented substantially perpendicularly to the windshield 19 as the wiper blade 10 pivots from the intermediate position M to the turning position E. It is noted that the trailing end 16*b* evenly wipes the surface 19E" and its surroundings.

As is apparent from the foregoing description in FIG. 11 through FIG. 14, the first and second twisting members 17, 18 twist the blade rubber 16 in response to the pivotal movement of the wiper blade 10. More specifically, the members 17, 18 cause the second division holding members 43, 53 to pivot in a lateral or transverse direction of the primary lever 11 in response to the pivotal movement of the wiper blade 10 mounted to the arm 63. Thus, the surface across which the wiper blade 10 pivots or moves can be evenly wiped by the same.

As shown in FIG. 15A, the proximal end A, the center part B and the distal ends C of the conventional wiper blade 101 provide the error angles e1, e2, e3, respectively, which are much different from each other when the wiper blade 101 pivots to the position D.

As shown in FIG. 15B, however, the error angles θ1, θ2, θ3 of the leading end 16t, the central portion 16m, and the trailing end 16b of the blade rubber 16 are neither positive nor negative. That is, they are all substantially zero degree regardless of the position of the wiper blade 10.

The arm 63 may be constructed in a variety of other ways such that the blade rubber 16 is twisted in correspondence to the radius of curvature of the windshield surface.

Although the drive pins 47, 57 are caused to turn clockwise or otherwise counterclockwise by means of the first and second links 46, 56, the movement of the first and second sub-arms 44, 54 may be converted into the turning movement of the drive pins 47, 57 in a variety of other ways.

The first and second sub-arms 44, 54 may be disposed in any orientation without interfering with the operation of the arm 63.

When "the central position 16m, the leading end 16t, and the trailing end 16b of the blade rubber 16 are oriented substantially perpendicularly to the surface of the windshield", it is meant that the axes 35, 35', 35" extend substantially at right angles to the lines 32, 32', 32".

The present disclosure relates to the subject matter of Japanese Patent Application No. 2000-350156, filed on Nov. 16, 2000, the disclosure of which is expressly incorporated herein by reference in its entirety.

What is claimed is:

1. A wiper apparatus comprising:

(A) a drive shaft;
(B) an arm head connected to said drive shaft;
(C) an arm extending from said arm head, said arm being pivotable about said drive shaft; and
(D) a wiper blade mounted to said arm and extending in substantially parallel to said arm;

said wiper blade including:
   (a) a primary lever;
   (b) plural blade holding members mounted to said primary lever, said blade holding members being disposed in alignment;
   (c) a blade rubber mounted to said blade holding members;

said blade holding members each including:
   (i) a pivotal member;
   (ii) a twisting means fixed to said pivotal member;
   (iii) a non-pivotal member connected to said pivotal member in such a manner that said twisting means causes said pivotal member to pivot in a lateral direction of said primary lever in response to the pivotal movement of said arm.

2. A wiper apparatus according to claim 1, wherein said twisting means comprises a sub-arm pivotable on a support shaft spaced from said drive shaft by a given distance, and a cam connected to said sub-arm, said sub-arm causing said cam to pivot in such a manner that said pivotal member pivots in the lateral direction of said primary lever.

* * * * *